Figure 1A:
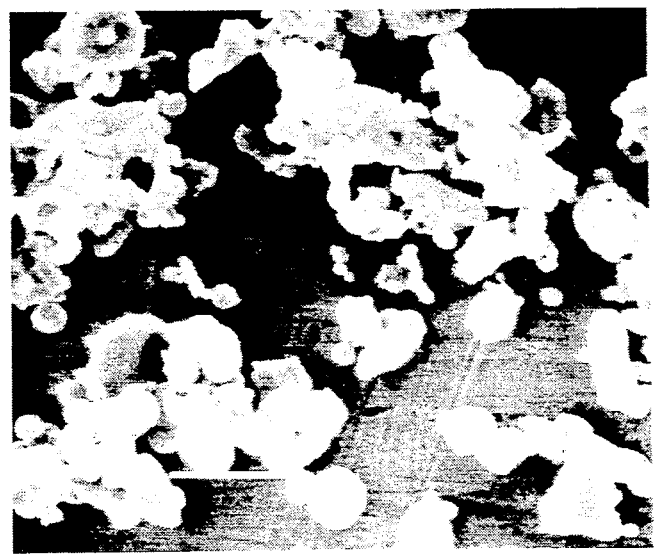

United States Patent
Takahashi et al.

[11] Patent Number: 5,095,048
[45] Date of Patent: Mar. 10, 1992

[54] METHOD OF MANUFACTURING A COMPOSITION FOR USE IN INJECTION MOLDING POWDER METALLURGY

[75] Inventors: Nobuji Takahashi, Sagamihara; Kouhei Kibayashi, Yamato, both of Japan

[73] Assignee: Sumitomo Metal Mining Co., Ltd., Tokyo, Japan

[21] Appl. No.: 591,982

[22] Filed: Oct. 1, 1990

[51] Int. Cl.⁵ ............................................. C08K 7/18
[52] U.S. Cl. .................................... 523/223; 264/15; 264/342; 264/328.1; 264/328.18; 264/109
[58] Field of Search ............ 264/328.18, 328.1, 109, 264/15, 342; 523/223

[56] References Cited

FOREIGN PATENT DOCUMENTS 0291201  11/1988  European Pat. Off. ............ 264/15
0273206  11/1989  Fed. Rep. of Germany ........ 264/15
0118001   5/1988  Japan ................................. 264/342

Primary Examiner—Paul R. Michl
Assistant Examiner—Peter Szekely
Attorney, Agent, or Firm—Watson, Cole, Grindle & Watson

[57] ABSTRACT

A composition for use in injection molding powder metallurgy, is provided by applying mechanical sphericalization to a metal powder of an irregular shape and having an average grain size of not more than 50 μm to form a sphericalized metal powder, and then mixing and kneading a binder of not more than 9 parts by volume relative to 11 parts by volume of the sphericalized metal powder.

6 Claims, 4 Drawing Sheets

20 μm

10 μm

20 μm

10 μm

METHOD OF MANUFACTURING A COMPOSITION FOR USE IN INJECTION MOLDING POWDER METALLURGY

BACKGROUND OF THE INVENTION

1. Field of the Invention

The present invention concerns a method of manufacturing a composition for use in injection molding powder metallurgy, which composition enables the production of products of excellent dimensional accuracy.

2. Description of the Prior Art

The demand for products of complicated shapes has increased in recent years with an increase in demand for mechanical parts. Injection molding powder metallurgy has been employed to obtain products of complicated shapes using a composition comprising a mixture of a metal powder and a, i.e. binder using an extrusion molding machine having substantially the same structure as that of an injection molding machine used for plastic molding, removing binders from the molded products and then sintering with heat. In injection molding powder metallurgy, since a great amount of binder has to be used in forming a metal powder composition, the molded product after the removal of the binder is porous and the density of the sintering product can not be increased. In view of the above, it has been attempted to obtain a high density sintering product by using a highly sinterable fine powder or a powder of spherical granular shape which packs so well as to reduce the amount of binder required. That is, it has been proposed to produce an injection molding composition by using a fine water-atomized powder or a spherical gas-atomized powder classified to not greater than 50 μm as the starting powder for injection molding, and mixing and kneading such a powder with a binder.

However, even though the product obtained by water-atomization is a fine powder is characterized by irregular granular shape although it is a fine powder. Accordingly, a binder has to be added to the extent of at least 45% by volume of the composition, which leads to not only a deterioration in the strength of the molded product after the binder-removing treatment, but also a reduction in handlability, and, in addition, shape defects such as warps or voids when sintered. On the other hand, a powder obtained by gas atomization has an average grain size of more than 50 μm and the injection moldability of the composition is poor since the grain size is quite coarse. In addition, the molded product has poor sinterability and the sintering density can not be increased as it is. Accordingly, it is necessary to sieve the average grain size to not greater than 50 μm in a case of a gas-atomized powder and, thus, only a portion of the powder obtained by gas atomization can be used, leading to the disadvantage of increased cost.

OBJECT OF THE PRESENT INVENTION

It is, accordingly, an object of the present invention to overcome the foregoing problems and to provide a method of manufacturing a composition for use in injection molding powder metallurgy capable of producing injection molding powder metallurgy products of good dimensional accuracy.

SUMMARY OF THE INVENTION

The present inventors have made earnest studies for overcoming the foregoing problems and attaining the foregoing object and, as a result, have accomplished the present invention based on the knowledge that irregular metal powder can be sphericalized by means of mechanical means without changing the grain size distribution and on the finding that the foregoing object can be attained by reducing the amount of a binder in the injection molding composition by kneading a mechanically sphericalized metal powder and a binder at a specific ratio.

That is, the foregoing object of the present invention can be attained by a method of manufacturing a composition for use in injection molding powder metallurgy, which comprises applying mechanical sphericalization to a metal powder of an irregular shape having an average grain size of not greater than 50 μm and mixing and kneading not more than 9 parts by volume of a binder based on 11 parts by volume of the resultant sphericalized metal powder.

The metal powder of irregular shape used in the present invention is, for example, a metal powder obtained by water atomization having average grain sizes of not greater than 50 μm and, preferably, not greater than 20 μm. Since the sintering activity of the metal powder is reduced to the point of failing to provide a high density sintering product if the average grain size exceeds 50 μm, the average grain size is defined in the present invention as not greater than 50 μm.

The mechanical sphericalization requires means for sphericalizing a metal powder of indefinite shape by colliding metal powders of indefinite shape to each other or colliding the metal powder against the surface of a hard member by means of an impact shock-type pulverizer, for example, a jet mill, a pin mill or a hammer mill. The above-mentioned amount of binder, i.e., not more than 9 parts by volume of the binder based on 11 parts by volume of the resultant sphericalized (or spheroidized) metal powder, can be obtained by application of a single sphericalization (or spheroidization), but the amount of the binder can be reduced further than the above-mentioned amount by application of several repeated sphericalizations (or spheroidizations) without changing the grain size distribution.

The binder used herein must not chemically react with the metal powder, it must be capable of providing the composition with fluidity upon heating and, further, it must be easily removable. I can be, at least one thermoplastic compound such as ethylene polymer or wax and, together with an appropriate wetting agent, if necessary.

The mixing ratio of the sphericalized metal powder and the binder is defined as not more than 9 parts by volume of the binder based on 11 parts by volume of the metal powder, since the strength of the molded product after the removal of binder is remarkably reduced and, in addition, the density of the sintering product after sintering is low to form sintering products with many defects for the shape and the inside if the amount of the binder exceeds 9 parts by volume.

The thus-blended metal powder and the binder are sufficiently kneaded, for example, in a heated planetary mixer.

BRIEF DESCRIPTION OF THE ACCOMPANYING DRAWINGS

Figure 1B:
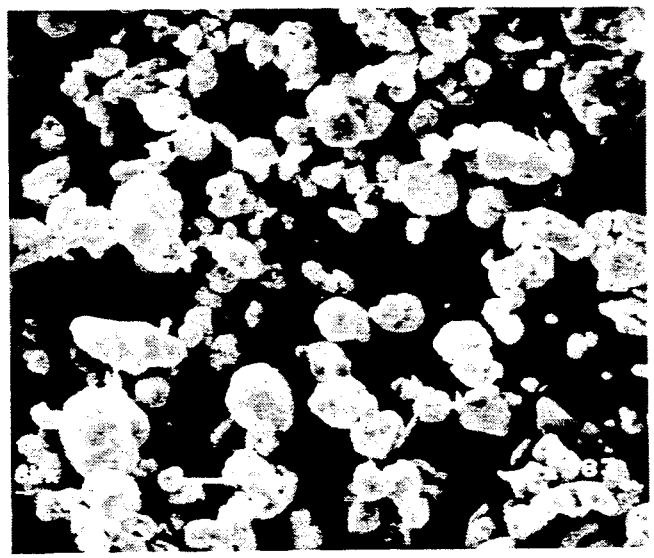

FIGS. 1a and b are x-ray photographs shown by a scanning type electron microscope for the examples of the particle shapes of the metal powder used in the present invention, FIG. 1a before sphericalization and FIG. 1b after repeating sphericalization by a pin mill five times.

Figure 2:
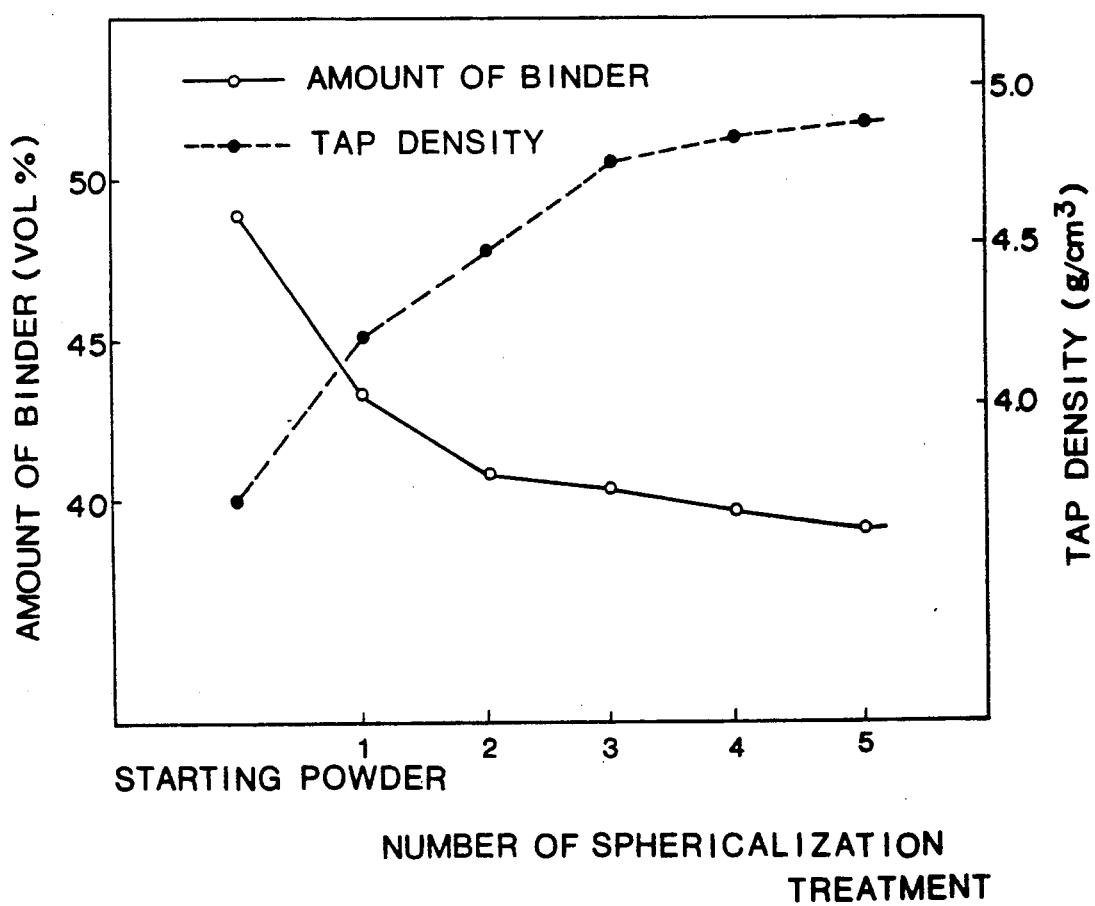
Figure 3A:
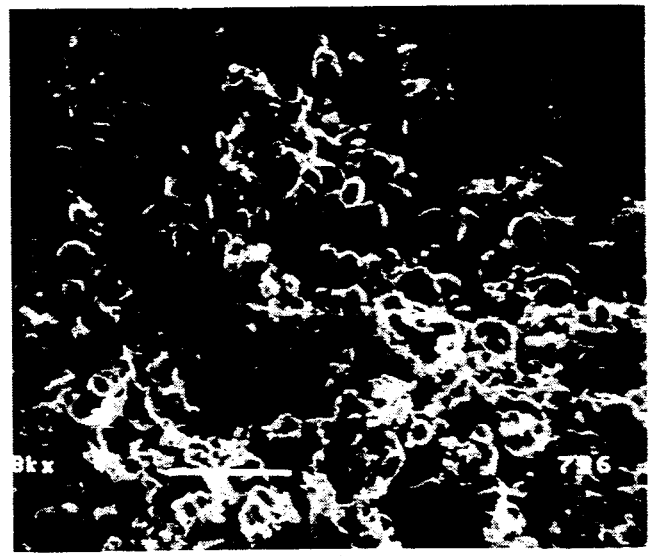
Figure 4:
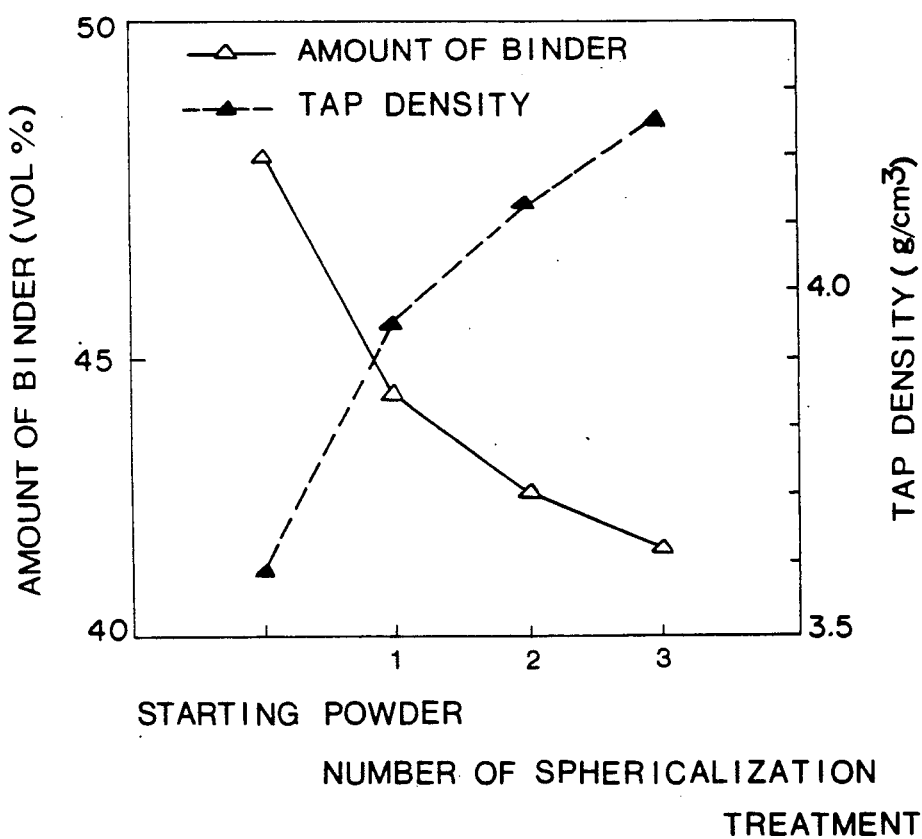

FIG. 2 is a graph illustrating a relationship between the number of sphericalization treatment by the pin mill and the amount of the binder and the tap density;

FIGS. 3a and b are x-ray photographs similar to those in FIG. 1 when using a jet mill;

FIG. 4 is the view similar to that in FIG. 2 when using the jet mill.

EXAMPLE

The present invention will now be described referring to examples.

EXAMPLE 1

Sphericalized SUS 316 L powder was prepared by repeating sphericalization for 1 to 5 times each time for 30 min by using a pin mill from commercially available SUS 316 L powder manufactured by water atomization (−325 mesh, not greater than 44 μm grain size).

The prepared SUS 316 L powder was heated and kneaded with addition of ethylene copolymer as a binder to obtain an injection molding composition. The resultant composition was heated at 150° C. and melted so as to flow out from an orifice tube at 100 g/min, wherein the amount of the binder was measured by a melt flow indexer used for a flow evaluation of plastics (JIS K 7210).

After molding each of the thus-obtained compositions by injection molding powder metallurgy into 10 mm×15 mm×7 mm plate-like shape by using an apparatus like that an injection molding machine used for the plastic injection molding, sintering products were manufactured by way of a known binder-removing treatment of removing the binder by heating and then applying a sintering treatment comprising heating the product in a vacuum atmosphere to 800° C. at a temperature elevating rate of 10° C./min, applying degasing while maintaining at 800° C. for 60 min, heating up to 1350° C. at a temperature elevating rate of 20° C./min, maintaining at 1350° C. for 60 min and then cooling.

Grain size distribution was measured for water-atomized SUS 316 L powders before sphericalization (corresponding to comparative example) and after applying sphericalization repeatedly five times. The results are shown in Table 1. Further, scanning-type electron microscopic photographs before sphericalization (corresponding to comparative example) and after sphericalization five times are shown in FIG. 1. FIG. 1a shows the result before sphericalization and FIG. 1b shows the result after sphericalization.

Then, a tap density was determined as a density when the metal powder was packed into a vessel while applying vibrations for the metal powder before sphericalization (corresponding to comparative example) and on every sphericalization and the relationship between the tap density and the number of sphericalization is shown in FIG. 2, and a relationship between the number of sphericalization treatment and the amount of the binder in the composition is shown in FIG. 2.

Further, sintering products were manufactured by using metal powders without sphericalization (corresponding to comparative example) and by using metal powders on every sphericalization respectively, and size for the 10 mm side was measured in each of the cases and the results are shown in Table 2.

TABLE 1

| Grain size (μm) | Volume fraction (%) | |
|---|---|---|
| | Starting powder | After 5 times sphericalization |
| 2.00–2.51 | 0.0 | 0.0 |
| 2.52–3.16 | 0.4 | 0.3 |
| 3.17–3.99 | 0.8 | 0.8 |
| 4.00–5.03 | 2.2 | 2.2 |
| 5.04–6.34 | 4.6 | 4.6 |
| 6.35–7.99 | 7.9 | 8.1 |
| 8.00–10.0 | 11.4 | 12.0 |
| 10.1–12.6 | 15.4 | 15.4 |
| 12.7–15.9 | 20.4 | 20.2 |
| 16.0–20.1 | 19.2 | 18.1 |
| 20.2–25.3 | 14.3 | 14.5 |
| 25.4–31.9 | 3.4 | 3.7 |
| 32.0–40.3 | 0.0 | 0.0 |

TABLE 2

| Number of sphericalization | 0 | 1 | 2 | 3 | 4 | 5 |
|---|---|---|---|---|---|---|
| Dimensional accuracy 3σ (n = 5) (mm) | ±0.07 | ±0.05 | ±0.04 | ±0.04 | ±0.03 | ±0.03 |

From the results, it can be seen that the powdery particles are sphericalized as shown in FIG. 1 with no change in the grain size distribution of the metal powder and, as a result, the tap density, that is, the packing property of the metal powder, is improved and the amount of binder in the composition can be reduced to not more than 45% by volume, that is, not more than 9 parts by volume based on 11 parts by volume of the metal powder by applying sphericalization for at least once by a pin mill for the metal powder as shown in FIG. 2 and the shrinkage upon sintering can be reduced to improve the dimensional accuracy as shown in Table 2.

EXAMPLE 2

Figure 3B:

Compositions were prepared in the same way as those in Example 1 except for applying sphericalization for 1 to 3 times by using a jet mill to manufacture a sintering product. Each of the measurements like that in Example 1 was conducted during and after the operations. The grain size distribution before and after the sphericalization by the jet mill is shown in Table 3, while the result of scanning type electron microscopic observation for the shape of the particles before and after the sphericalization is shown in FIG. 3, and the relationship between the tap density of the metal powder and the amount of the binder to the number of sphericalization is shown in FIG. 4. Also in this example, those before sphericalization correspond to the comparative example as in Example 1.

TABLE 3

| Grain size (μm) | Volume fraction (%) | |
|---|---|---|
| | Starting powder | After 3 times sphericalization |
| 2.00–2.51 | 0.4 | 0.1 |
| 2.52–3.16 | 0.9 | 0.7 |
| 3.17–3.99 | 1.4 | 1.6 |
| 4.00–5.03 | 3.0 | 4.0 |
| 5.04–6.34 | 5.8 | 7.4 |
| 6.35–7.99 | 9.3 | 11.6 |
| 8.00–10.0 | 13.3 | 15.1 |
| 10.1–12.6 | 18.0 | 18.9 |
| 12.7–15.9 | 21.9 | 20.9 |

TABLE 3-continued

| Grain size (μm) | Volume fraction (%) | |
| --- | --- | --- |
| | Starting powder | After 3 times sphericalization |
| 16.0–20.1 | 17.1 | 14.7 |
| 20.2–25.3 | 7.8 | 5.0 |
| 25.4–31.9 | 1.1 | 0.0 |
| 32.0–40.3 | 0.0 | 0.0 |

From the results, it can be observed that the particles can be sphericalized without changing the grain size distribution by the treatment using the jet mill like that in Example 1 and, as a result, the amount of binder can be reduced to not more than 45% by volume.

In the present invention, when a metal powder of an irregular shape of a specific grain size is mechanically sphericalized and, thereafter, the sphericalized metal powder and the binder are blended at a specific ratio into a composition, it can be seen that the metal powder becomes spherical without its grain size distribution being changed, the amount of binder in the composition to be molded can be reduced, and the dimensional accuracy of the sintering molded product is improved and defects are reduced.

What is claimed is:

1. A method of manufacturing a composition for use in injection molding powder metallurgy, which comprises the steps of:
   (a) providing a metal powder whose grains are of irregular shape and wherein the average grain size does not exceed 50 μm,
   (b) mechanically sphericalizing the metal powder of step (a) to provide a sphericalized metal powder,
   (c) mixing a binder into said sphericalized metal powder at a ratio of 9 parts by volume of binder to 11 parts by volume of powder, and
   (d) kneading the mixture of step (c), thereby providing said composition.

2. The method according to claim 1, wherein the metal powder of step (a) has a average grain size of not more than 20 μm.

3. The method according to claim 1, wherein in step (b) the grains of metal powder are impacted against one another or against a hard surface.

4. The method according to claim 1, wherein said binder is selected from the group consisting of ethylene polymer and wax.

5. The method according to claim 1, wherein in step (c) a wetting agent is mixed into said sphericalized metal powder.

6. The method according to claim 5, wherein in step (d) the mixture is kneaded in a planetary mixer.

* * * * *